US 8,281,909 B2

(12) United States Patent
Hiratsuka

(10) Patent No.: US 8,281,909 B2
(45) Date of Patent: Oct. 9, 2012

(54) VEHICLE DRUM BRAKE

(75) Inventor: Akira Hiratsuka, Nagano (JP)

(73) Assignee: Nissin Kogyo Co., Ltd., Nagano (JP)

(*) Notice: Subject to any disclaimer, the term of this patent is extended or adjusted under 35 U.S.C. 154(b) by 13 days.

(21) Appl. No.: 12/943,536

(22) Filed: Nov. 10, 2010

(65) Prior Publication Data

US 2011/0114429 A1      May 19, 2011

(30) Foreign Application Priority Data

Nov. 13, 2009  (JP) ................................ 2009-259402

(51) Int. Cl.
*F16D 51/00*  (2006.01)

(52) U.S. Cl. ..................................... 188/325; 188/79.51

(58) Field of Classification Search .................. 188/325, 188/79.51, 79.55, 79.56, 79.59, 79.64, 78, 188/196 R, 196 F, 196 V
See application file for complete search history.

(56) References Cited

U.S. PATENT DOCUMENTS

| | | | | | |
|---|---|---|---|---|---|
| 4,452,344 | A | * | 6/1984 | Muscat | 188/79.63 |
| 5,067,596 | A | * | 11/1991 | Johannesen | 188/79.54 |
| 5,167,304 | A | * | 12/1992 | Capek | 188/325 |
| 6,691,838 | B2 | * | 2/2004 | Wang | 188/79.51 |
| 6,702,071 | B2 | * | 3/2004 | Wang | 188/79.54 |
| 2006/0144658 | A1 | * | 7/2006 | Tessitore et al. | 188/325 |

FOREIGN PATENT DOCUMENTS

| | | |
|---|---|---|
| JP | 57-119133 | 7/1982 |
| JP | 57-119133 U | 7/1982 |
| JP | 62-110635 | 5/1987 |
| JP | 62-110636 | 5/1987 |
| JP | 62-110635 U | 7/1987 |
| JP | 62-110636 U | 7/1987 |
| JP | 03-044237 | 2/1991 |
| JP | 03-044237 A | 2/1991 |
| JP | 03-044237 U | 4/1991 |
| JP | 7753 | 1/1995 |
| JP | 2002295542 | 10/2002 |
| JP | 2004-353751 | 12/2004 |
| JP | 2004-353751 A | 12/2004 |

OTHER PUBLICATIONS

Japanese Patent Office Action for Appl. No. 2009-259402 dated Sep. 13, 2011.
Publication Submission Form dated Aug. 9, 2011 for Appl. No. 2009-259402.

* cited by examiner

*Primary Examiner* — Pamela Rodriguez
(74) *Attorney, Agent, or Firm* — Andrew M. Calderon; Roberts Mlotkowski Safran & Cole, P.C.

(57) ABSTRACT

A vehicle drum brake includes: a first brake shoe; a second brake shoe; a parking brake lever connected with the second brake shoe; a pull unit connected with the parking brake lever; a strut including a curved portion which is curved towards an outer circumferential side of the backing plate, the strut being disposed between a portion of the parking brake lever which lies closer to the portion where the pull mechanism is connected than the portion where the parking brake lever is attached and the first brake shoe; a strut return spring for returning the strut in a non-operating state to its initial position is provided to extend between the strut and the second brake shoe; and an engagement hole formed in the curved portion of the strut for one end portion of the strut return spring to be brought into engagement therewith.

20 Claims, 2 Drawing Sheets

VEHICLE DRUM BRAKE

BACKGROUND

1. Field of the Invention

The present invention relates to a vehicle drum brake and more particularly to a connecting construction of a strut disposed between a parking brake lever and one of brake shoes and a strut return spring for returning the strut to its initial position.

2. Description of the Related Art

As vehicle drum brakes, there are known a drum brake having a construction in which a pair of brake shoes, that is, a first brake shoe and a second brake shoe, which are disposed to face each other on an interior side of a backing plate which is fixedly attached to a vehicle body, both the brake shoes are held at a predetermined interval while distal end portions thereof are biased so as to narrow a distance therebetween by a return spring, and the distal end portions of the brake shoes are caused to move away from each other towards an inner circumferential surface of the drum brake so as to expand the distance therebetween when the brakes are applied. As parking brake mechanisms adapted to be incorporated in drum brakes like the one described above, there is a parking brake mechanism in which the movable end portion of the second shoe and one end of a parking brake lever are connected rotatably by a pivot, a pull means such as a parking brake cable or a brake rod which is pulled by an operating member such as a hand parking brake lever or a foot parking brake pedal is connected to the other end of the parking brake lever, and a parking brake actuating strut is disposed between a position which lies closer to where the pull means is connected than where the parking brake lever is connected to the second brake shoe and the movable end portion of the first brake shoe.

This strut includes a curved portion which is curved towards an outer circumferential side of the backing plate so as to avoid an interference with a member such as a hub unit disposed at the center of the backing plate at a longitudinal central portion thereof. In the strut, an engagement hole is provided in an end portion which lies closer to the second brake shoe 2 than the curved portion for a strut return spring adapted to return the strut to its initial position after it ends its operation to be brought into engagement therewith. The strut return spring is brought into engagement with the engagement hole at one end and an installation hole formed in the second brake shoe at the other end thereof (refer to JP-UM-B-7-753 and JP-A-2002-295542, for example).

In the strut described in JP-UM-B-7-753 and JP-A-2002-295542, a fitting groove where a web of the second brake shoe and the parking brake lever are fitted in a superposed state is provided in the one end portion of the strut where the engagement hole is provided. To form the engagement hole in the way described above, the one end portion of the strut has to be caused to project in the direction of an axle so as to ensure that the one end portion has a required thickness. However, the projecting amount of the one end portion in the direction of the axle has to be suppressed to as low a level as possible to avoid the enlargement of the strut, and to make this happen, it is not possible to ensure giving the one end portion an enough thickness to form therein an engagement hole like the one described above through punching by a press. Due to this, since such an engagement hole has to be formed by a cutting operation, some labor hours have to be spent forming the engagement hole, resulting in a poor productivity.

SUMMARY

In order to solve the above problem, an object of the invention is to provide a vehicle drum brake which can suppress an increase in a thickness dimension in the direction of an axle of a strut and which can be provided with an enough thickness at a portion where to form an engagement hole with which a strut return spring is brought into engagement to form such an engagement hole through a punching operation by a press.

According to an aspect of the invention, there is provided a vehicle drum brake including: a pair of brake shoes including a first brake shoe and a second brake shoe, the first brake shoe and the second brake shoe being disposed symmetrically on an interior side of a backing plate which is fixedly attached to a vehicle body so as to move away from each other at distal end portions about proximal end portions thereof as rotating centers to thereby expand a distance therebetween; a parking brake lever connected rotatably with a movable distal end portion of the second brake shoe by a pivot; a pull unit connected with the parking brake lever; a strut including a curved portion which is curved towards an outer circumferential side of the backing plate, the strut being disposed between a portion of the parking brake lever which lies closer to the portion where the pull means is connected than the portion where the parking brake lever is attached and a movable distal end portion of the first brake shoe; a strut return spring for returning the strut in a non-operating state to its initial position is provided to extend between the strut and the second brake shoe; and an engagement hole formed in the curved portion of the strut for one end portion of the strut return spring to be brought into engagement therewith. Besides, a part of the engagement hole may be disposed on an extension of a side surface of a web of the second shoe, the side surface lying on a side opposite to the backing plate. Further, the curved portion of the strut may be curved along a hub unit disposed on the backing plate so as to avoid an interference with the hub unit.

According to the vehicle drum brake of the invention, the one end portion of the strut does not have to be caused to project in the direction of the axle as done conventionally by forming the engagement hole in the curved portion of the strut for the hook formed at the one end of the strut return spring to be brought into engagement therewith, thereby making it possible to suppress an increase in the thickness dimension of the strut in the direction of the axle. In addition, since the curved portion of the strut has a predetermined thickness, the engagement hole can be formed through punching by a press, thereby making it possible to realize a reduction in the production costs.

Further, since the backing plate side lateral side surface of the engagement hole is disposed on the extension of the side surface of the second brake shoe which lies on the opposite side to the backing plate, the strut return spring can be provided to extend while avoiding as much as possible a chance for the strut return spring to be inclined, thereby making it possible to secure the spring force of the strut return spring while suppressing the thickness dimension of the strut in the direction of the axle to as thin a thickness as possible.

It becomes possible to save on a space inside the drum brake while securing the thickness of the curved portion by curving the curved portion of the strut along the hub unit disposed on the backing plate.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
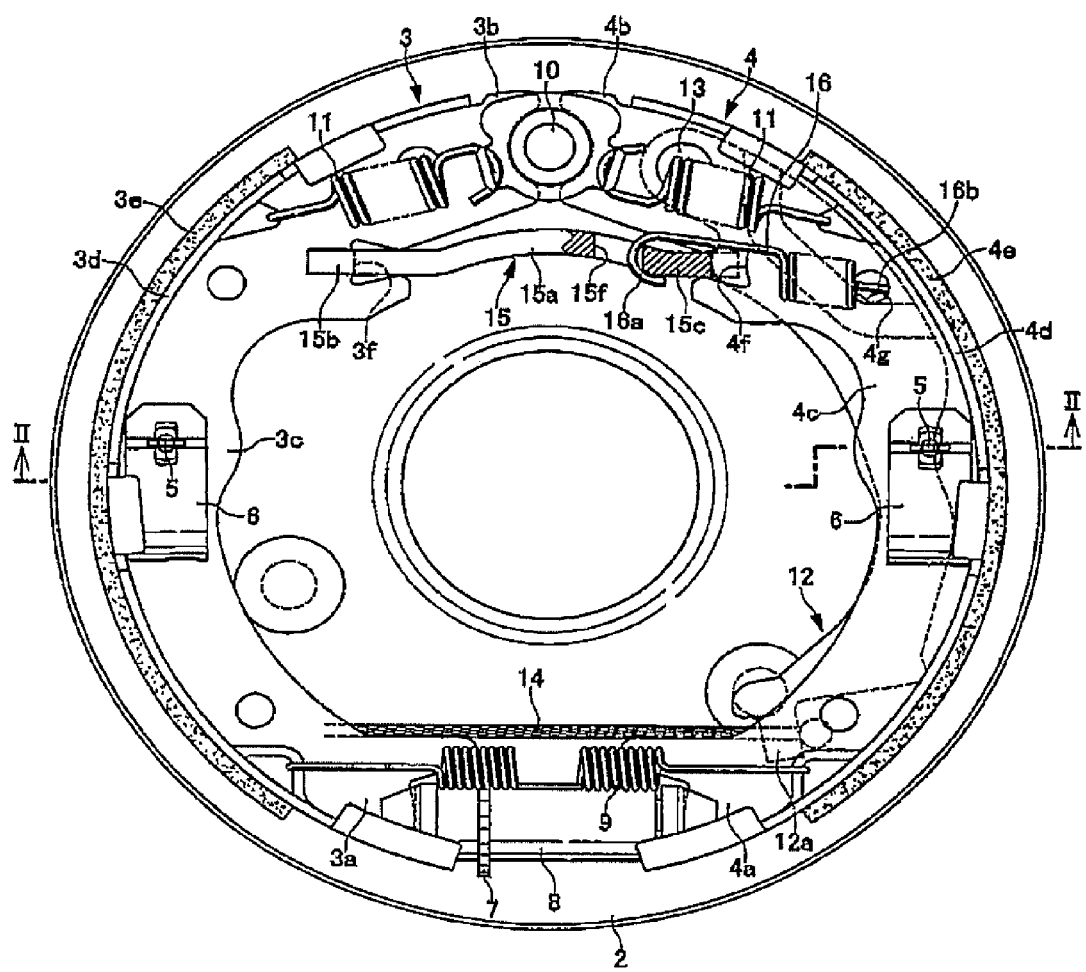
FIG. 1 is a partially sectional front view of a vehicle drum brake showing one embodiment of the invention.

A vehicle drum brake 1 shown in the figures is a dual-servo type mechanical drum brake. A first brake shoe 3 on a first side and a second brake shoe 4 on a second side are disposed to face each other on an internal side of a backing plate 2 which is bolted to a vehicle body (not shown). Distal end portions 3b, 4b of the first and second shoes 3, 4 are caused to move away from each other about proximal end portions 3a, 4a thereof as rotating fulcrums to thereby expand a distance therebetween.

The brake shoes 3, 4 each include a web 3c, 4c which is disposed parallel to the backing plate 2, a rim 3d, 4d which is fixedly attached to an outer edge of the web 3c, 4c in a direction in which they meet each other at an angle and a lining 3e, 4e which is affixed to an outer circumferential surface of the rib 3d, 4d. The brake shoes 3, 4 are held on the backing plate 2 in a spring-like fashion substantially at intermediate portions of webs 3c, 4c by shoe holding pins 5, 5 and shoe holding springs 6, 6.

A floating support 8 is disposed between the proximal end portions 3a, 9a of the brake shoes 3, 4, and this floating support a includes an adjusting mechanism operated by an adjusting gear 7. The proximal end portions 3a, 4a are supported at ends of the floating support 8 in a press contact state by a shoe return spring 9 which is provided to expand between the proximal end portions 3a, 4a. In addition, an anchor pin 10 is provided between the distal end portions 3b, 4b of the brake shoes 3, 4. With the anchor pin 10 so provided, when not in an operating state, the brake shoes 3, 4 are biased in a direction in which they approach each other to narrow the distance therebetween by return springs 11, 11 which are provided to expand between the anchor pin 10 and the distal end portions 3b, 4b, respectively, so that the distal end portions 3b, 4b are brought into press contact with the anchor pin 10 to thereby be supported thereat.

A pivot 13 is provided in proximity to the distal end portion 4b of the second brake shoe 9 so that a parking brake lever 12 is connected thereto. A connecting portion 12a is provided at the other end of the parking brake lever 12, and it is this connecting portion 12a to which a parking brake cable 14 is connected which constitutes a pull means for pulling on the parking brake lever 12. The parking brake cable 14 is passed through an insertion hole in the backing plate 2 to be led into the internal side from an external side of the backing plate 2.

A parking brake actuating strut 15 is disposed between a portion of the barking lever 12 which lies closer to the connecting portion 12a than the pivot 13 and a distal end portion of the web 3c of the first brake shoe 3 so as to lie close to the anchor pin 10. A strut return spring 16 is provided to extend between the strut 15 and the web 4c of the second brake shoe 4 to bias the strut 15 towards the second brake hoe 4 side.

Figure 2:
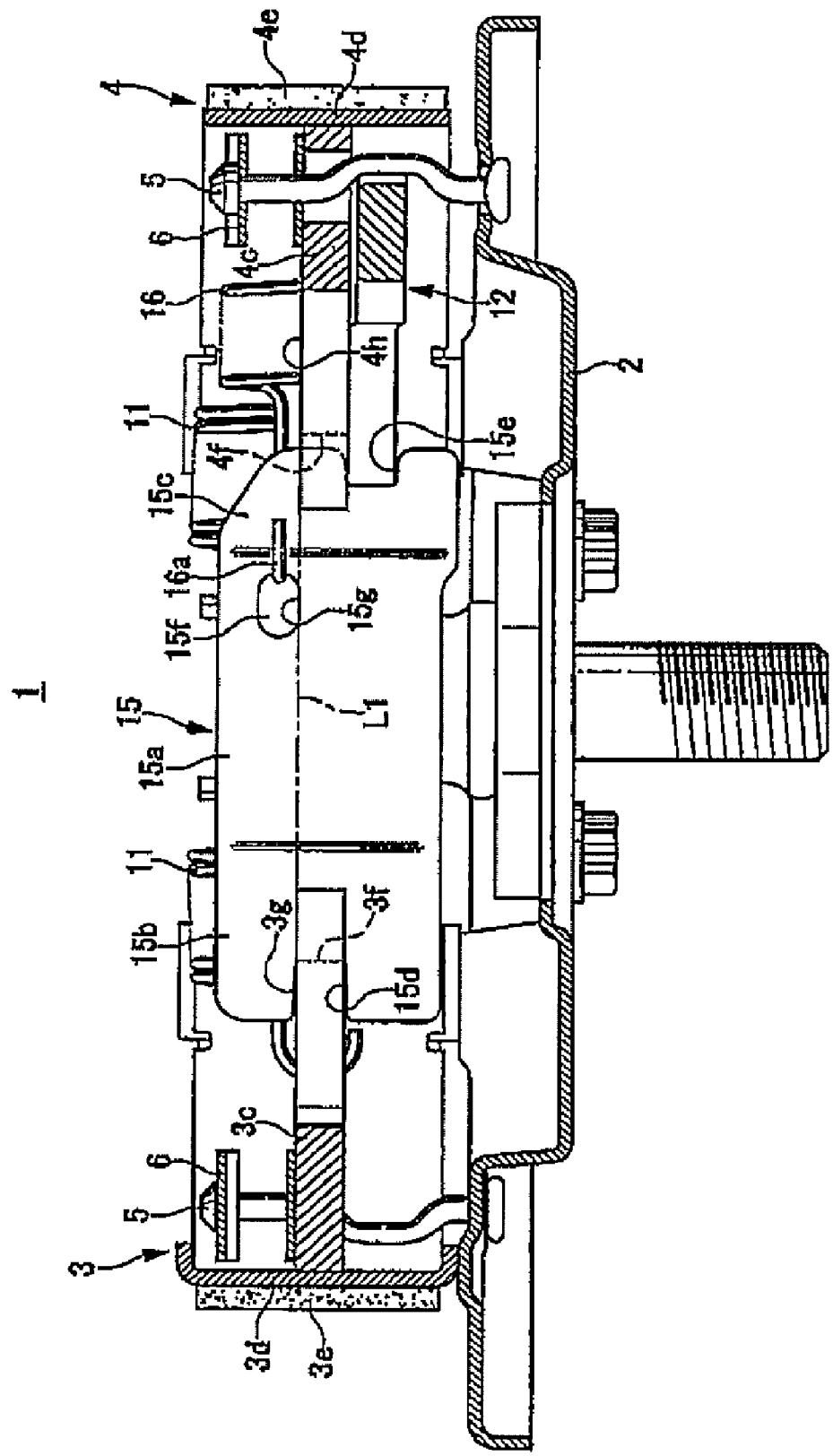
FIG. 2 is a sectional view taken along the line II-II in FIG. 1.

The strut 15 includes at a longitudinal intermediate portion thereof a curved portion 15a which is curved towards an outer circumferential side of the backing plate so as to avoid an interference with a member such as a hub unit which is disposed at the center of the backing plate. The strut 15 also includes straight portions 15b, 15c at end portions. Fitting grooves 15d, 3f are provided in the straight portion 15b at a first brake shoe side of the strut 15 and the web 3c of the first brake shoe 3, respectively, and these fitting grooves fit in each other in an orthogonal direction. A fitting groove 15e is provided in the straight portion 15c at a second brake shoe side of the strut 15, and the web 4c of the second brake shoe 4 and the parking brake lever 1 fit in this fitting groove 15e in a superposed state. A fitting groove 4f is provided in the web 4c of the second brake shoe 4, and the strut 15 fits in this fitting groove 4f. An engagement hole 15f for the strut return spring 16 is formed in a second brake shoe 2 side of the curved portion 15a of the strut 15 through punching by a press, and hooks 16a, 16b which are formed at both ends of the strut return spring 16 are brought into engagement with the engagement hole 15f and an installation hole 4g formed in the web 4c of the second brake shoe 4, respectively. As is shown in FIG. 2, the strut hole 15f is formed into an elliptic shape which is long in an longitudinal direction of the strut 15, and a lateral side surface 15g of the engagement hole 15f which lies on a backing plate side of the same hole is disposed on an extension of a side surface 4h of the web 4c of the second brake shoe 2 which lies on a side opposite to a side thereof which faces the backing plate 2. Namely, the engagement hole 15f is formed so that part thereof is positioned on an imaginary line L1 resulting by extending the side surface 4h lying on the opposite side to the backing plate towards a side surface 3g of the web 3c of the first brake shoe 3 which lies on a side opposite to a side thereof which faces the backing plate (and connecting the side surfaces 3g, 4h which lie on the opposite side to the backing plate).

In the drum brake 1 which is formed in the way described above, when the parking brake cable 14 is pulled by operating an operating member such as a hand parking brake handle or a foot parking brake pedal, the parking brake lever 12 tilts about the pivot 13 to push the strut 15 in the direction of the first brake shoe 3. When the strut 15 is so pushed, a pushing force is applied in a direction in which the distal end portion of the first brake shoe 3 is moved away from the distal and portion of the second brake shoe 4 to expand the distance therebetween. Then, as a reaction force resulting from the movement of the first brake shoe 3, a pushing force is applied to the second shoe 4 in a direction in which the distal end portion of the second shoe 4 is moved away from the distal end portion of the first brake shoe 3 to expand the distance therebetween. By the pushing forces being applied to both the brake shoes 3, 4 in the way described above, the brake shoes 3, 4 move away from each other to expand the distance therebetween in directions in which they move away from the anchor pin 10, that is, towards an outer circumferential side of the backing plate 2 against a returning force exerted by the return springs 11, 11 in directions in which the corresponding brake shoes 3, 4 are caused to return and a restoration force exerted by the strut return spring 16 in a direction in which the strut 15 is pulled back, whereby both the linings 3e, 4e are brought into sliding contact with an inner circumferential surface of the brake drum so that a braking force is generated by the brake shoes 3, 4.

In the event that the parking brake cable 14 is released from the pulled state when the parking brake is applied, the brake shoes 3, 4 return towards an inner circumferential side of the backing plate 2 by the returning force exerted by the return springs 11, 11 and the restoration force exerted by the strut return spring 16, whereby the parking brake lever 12 returns to its initial position to thereby cancel the braking force.

In this embodiment, the one end portion of the strut 15 does not have to be caused to project in the direction of the axle as done conventionally by forming the engagement hole 15f in the curved portion 15a of the strut 15 in the way described above for the hook 16a formed at the one end of the strut return spring 16 to be brought into engagement therewith, thereby making it possible to suppress an increase in the thickness dimension of the strut 15 in the direction of the axle. In addition, since the curved portion 15a of the strut 15 has a predetermined thickness, the engagement hole 15f can be formed through punching by a press, thereby making it possible to realize a reduction in the production costs. Further, since the backing plate side lateral side surface 15g of the engagement hole 15f is disposed on the extension of the side surface 4h of the second brake shoe 4 which lies on the opposite side to the backing plate, the strut return spring 16 can be provided to extend in a parallel state to the backing plate 2, thereby making it possible to secure the spring force of the strut return spring 16 while suppressing the thickness dimension of the strut 15 in the direction of the axle to as thin a thickness as possible.

The invention can be applied not only to the dual servo type mechanical drum brake described in the embodiment above but also to a cam type mechanical drum brake. In addition, the invention can also be applied to a drum brake which includes an automatic brake gap adjuster at moving end portions of brake shoes or a strut.

What is claimed is:

1. A vehicle drum brake comprising:
a pair of brake shoes including a first brake shoe and a second brake shoe, the first brake shoe and the second brake shoe being disposed symmetrically on an interior side of a backing plate which is fixedly attached to a vehicle body so as to move away from each other at distal end portions about proximal end portions thereof as rotating centers to thereby expand a distance therebetween;
a parking brake lever connected rotatably with the movable distal end portion of the second brake shoe by a pivot;
a pull unit connected with the parking brake lever;
a strut including a curved portion which is curved towards an outer circumferential side of the backing plate, the strut being disposed between a portion of the parking brake lever which lies closer to a portion where the pull unit is connected than a portion where the parking brake lever is attached and the movable distal end portion of the first brake shoe;
a strut return spring for returning the strut in a non-operating state to its initial position being provided to extend between the strut and the second brake shoe; and
an engagement hole formed in the curved portion of the strut for one end portion of the strut return spring to be brought into engagement therewith.

2. The vehicle drum brake according to claim 1, wherein a part of the engagement hole is disposed on an extension of a side surface of a web of the second brake shoe, the side surface lying on a side opposite to the backing plate.

3. The vehicle drum brake according to claim 1, wherein the curved portion of the strut is curved along a hub unit disposed on the backing plate so as to avoid an interference with the hub unit.

4. The vehicle drum brake according to claim 2, wherein the curved portion of the strut is curved along a hub unit disposed on the backing plate so as to avoid an interference with the hub unit.

5. The vehicle drum brake according to claim 1, wherein the engagement hole is formed into an elliptic shape which is long in a longitudinal direction of the strut, and a lateral side surface of the engagement hole lying on a backing plate side of the engagement hole is disposed on an extension of a side surface of a web of the second brake shoe which lies on a side opposite to a side thereof which faces the backing plate.

6. The vehicle drum brake according to claim 5, wherein the engagement hole is formed so that part thereof is positioned on an imaginary line resulting by extending the side surface lying on the opposite side to the backing plate towards a side surface of a web of the first brake shoe lying on a side opposite to a side thereof which faces the backing plate.

7. The vehicle drum brake according to claim 6, wherein one end portion of the strut does not project in a direction of an axle due to forming the engagement hole in the curved portion of the strut.

8. The vehicle drum brake according to claim 7, further comprising a hook formed at one end of the strut return spring to be brought into engagement with the engagement hole.

9. The vehicle drum brake according to claim 8, wherein the strut return spring extends in a parallel state to the backing plate, thereby making it possible to secure a spring force of the strut return spring while suppressing a thickness dimension of the strut in the direction of the axle.

10. The vehicle drum brake according to claim 9, wherein the web of the first brake shoe and the web of the second brake shoe are each disposed parallel to the backing plate, and the first brake shoe and the second brake shoe each further include:
a rim which is fixedly attached to an outer edge of the web in a direction in which they meet each other at an angle; and
a lining which is affixed to an outer circumferential surface of the rim.

11. The vehicle drum brake according to claim 10, wherein the first brake shoe and the second brake shoe are held on the backing plate in a spring-like fashion substantially at intermediate portions of the web of the first brake shoe and the web of the second brake shoe by shoe holding pins and shoe holding springs.

12. The vehicle drum brake according to claim 11, further comprising a floating support disposed between the proximal end portions of the first brake shoe and the second brake shoe, the floating support including an adjusting mechanism operated by an adjusting gear.

13. The vehicle drum brake according to claim 12, wherein the proximal end portions are supported at ends of the floating support in a press contact state by a shoe return spring which is provided to expand between the proximal end portions.

14. The vehicle drum brake according to claim 13, further comprising an anchor pin provided between the distal end portions of the first brake shoe and the second brake shoe, wherein, when not in an operating state, the first brake shoe and the second brake shoe are biased in a direction in which they approach each other to narrow a distance therebetween by return springs which are provided to expand between the anchor pin and the distal end portions, respectively, so that the distal end portions are brought into press contact with the anchor pin.

15. The vehicle drum brake according to claim 14, wherein the strut is disposed between a portion of the parking brake lever which lies closer to the pull unit than the pivot and a distal end portion of the web of the first brake shoe so as to lie close to the anchor pin.

16. The vehicle drum brake according to claim 1, wherein the strut return spring extends between the strut and a web of the second brake shoe to bias the strut towards the second brake shoe side.

17. A vehicle drum brake comprising:
a first brake shoe and a second brake shoe, the first brake shoe and the second brake shoe being disposed symmetrically on an interior side of a backing plate;
a strut including a curved portion which is curved towards an outer circumferential side of the backing plate;

a strut return spring for returning the strut in a non-operating state to its initial position being provided to extend between the strut and the second brake shoe; and an engagement hole formed in the curved portion of the strut for one end portion of the strut return spring to be brought into engagement therewith, wherein:

the engagement hole is formed into an elliptic shape which is long in a longitudinal direction of the strut, and a lateral side surface of the engagement hole lies on a backing plate side of the engagement hole and is disposed on an extension of a side surface of a web of the second brake shoe which lies on a side opposite to a side thereof which faces the backing plate, and the engagement hole is formed so that part thereof is positioned on an imaginary line resulting by extending the side surface lying on the opposite side to the backing plate towards a side surface of a web of the first brake shoe lying on a side opposite to a side thereof which faces the backing plate.

18. The vehicle drum brake according to claim 17, wherein:

the curved portion of the strut is at a longitudinal intermediate portion thereof a curved portion which is curved towards an outer circumferential side of the backing plate so as to avoid an interference with a hub unit which is disposed at the center of the backing plate;

the strut includes straight portions at end portions;

fitting grooves are provided in the straight portion at a first brake shoe side of the strut and the web of the first brake shoe, respectively, the fitting grooves fit in each other in an orthogonal direction; and a fitting groove is provided in the straight portion at a second brake shoe side of the strut, and the web of the second brake shoe and a parking brake lever fit in the fitting groove of the straight portion at the second brake shoe side of the strut in a superposed state.

19. The vehicle drum brake according to claim 18, further comprising a fitting groove provided in the web of the second brake shoe, and the strut fits in the fitting groove in the web of the second brake shoe.

20. The vehicle drum brake according to claim 19, wherein hooks which are formed at both ends of the strut return spring are brought into engagement with the engagement hole and an installation hole formed in the web of the second brake shoe, respectively.

* * * * *